J. G. CONSER.
Vegetable Cutter.
No. 587.
Patented Jan'y 27, 1838.
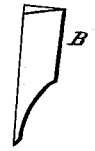
Fig: 4.
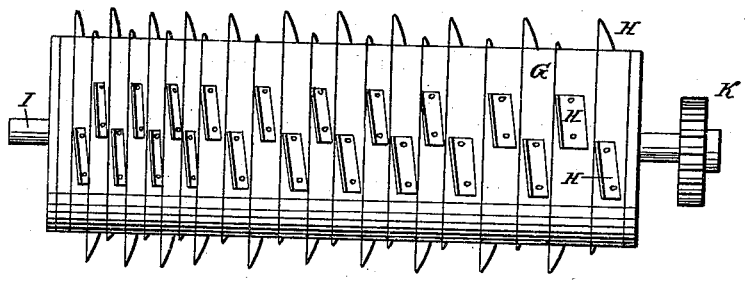
Fig: 2.
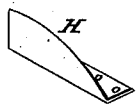
Fig: 5.
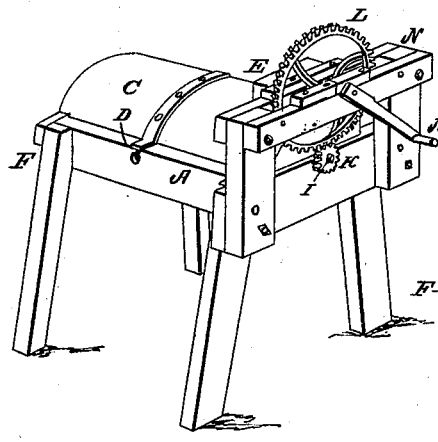
Fig: 1.
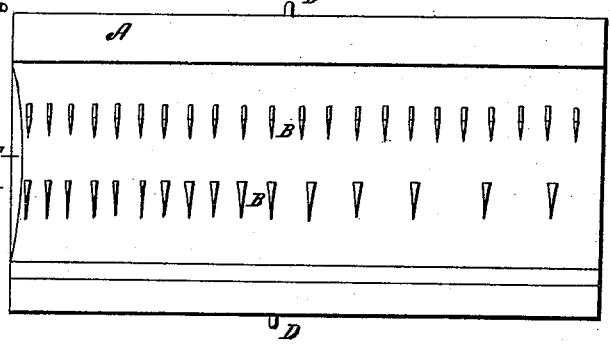
Fig: 3.

UNITED STATES PATENT OFFICE.

JNO. G. CONSER, OF REBERSBURG, PENNSYLVANIA.

MACHINE FOR CUTTING OR MINCING VEGETABLES, MEAT, AND OTHER SUBSTANCES.

Specification of Letters Patent No. 587, dated January 27, 1838.

*To all whom it may concern:*

Be it known that I, JOHN G. CONSER, of Rebersburg, Center county, State of Pennsylvania, have invented a new and useful Improvement in Machines for Cutting or Mincing Vegetables, Meats, and other Substances, which is described as follows, reference being had to the annexed drawings of the same, making part of the specification.

This machine consists of a concave or semi-circular trough A, Figures 1 and 3, armed inside with two rows of parallel blades or cutters B, Figs, 3, 4, set at equal distances apart and corresponding with the cutters on the revolving cylinder hereafter described, and which revolve between them without touching for cutting up or mincing vegetables or meat—said concave being supported on four inclining legs and having a semi-circular cap or cover C, Fig. 1, placed over the cylinder and secured to the sides of the concave by staples and hasps D. A hopper E for receiving the substance to be cut and conducting it between the cylinder and concave being placed in the top of said cap or cover at the upper end thereof.

A discharging aperture F is made in the lower end of the concave through which the substance after being minced is discharged.

B, Fig. 4, represents one of the cutters of the concave detached from the concave made similar to the section of a razor blade with a shank which is inserted into the concave.

G, Fig. 2, represents the cylinder which revolves within the concave. This cylinder is armed with six parallel rows of cutters, H, fastened to the cylinder in pairs longitudinally and parallel with the axis of the cylinder at unequal distances apart and corresponding with the cutters in the concave between which they revolve without touching them for cutting up the vegetables, meat or other substances.

Each cutter is made from an oblong piece of metal rounded and sharpened at one end and at the other end turned at right angles and pierced with apertures for bolts or screws that secure it to the surface of the cylinder—a mortise or cavity being made in the cylinder to receive it.

The cutters are arranged on the cylinder in the following manner.—Six lines are drawn on the surface of the cylinder in pairs longitudinally, and parallel with the axis,—the lines of each pair being about three inches apart. At right angles to these last mentioned lines, parallel but at unequal distances apart, are drawn any convenient number of lines, beginning at the feeding end of the cylinder at the distance of one inch and a quarter apart and gradually decreasing to a little less than half an inch apart at the discharging end. Between these lines are arranged the cutters standing obliquely to said lines—the cutters of the first row of every pair of rows are placed in such a manner that there shall be a blank space between every pair of cutters which space will be occupied by the cutter of the second row placed a little in advance of those of the first row and so on with all the spaces in the row. The fronts of the cutters of the first row extend beyond the heels or backs of the cutters of the second row to about a fifth of their width.

Fig. 5 represents one of the cutters of the cylinder detached from it. The cylinder is fixed on an angle I, Fig. 2, which turns in apertures in the ends of the concave—one end projecting so as to receive a pinion K into which works a cog wheel L turned by a crank M the axle of said cog-wheel turning in a small frame N raised upon the frame of the concave for supporting the same.

Operation: The vegetables, meat, or other substance required to be cut into small particles, or minced, are placed in the hopper by which they are conveyed between the cylinder and concave:—the crank handle is turned which revolves the cog-wheel and this the pinion on the end of the axle of the cylinder into which it works, which turns the cylinder—the cutters on its surface and those in the concave between which they work cutting up the meat, or vegetables into small particles which pass off through the opening at the end of the concave. The oblique position of the cutters or knives on the cylinders causes the meat or vegetables while undergoing the mincing operation to move gradually toward the discharging end of the concave and thus allows the knives to cut in a new place at every turn of the cylinder.

The invention claimed by me the said JOHN G. CONSER and which I desire to secure by Letters Patent consists in—

The arrangement of the knives or cutters on the cylinder as before described; but no other part of the machine is claimed.

JOHN G. CONSER.

Witnesses:
 W. P. ELLIOT,
 JO. B. WOOD.